Nov. 19, 1940.  W. A. ADAMS  2,222,219
TREADLE CONNECTION FOR POWER TRANSMITTER CLUTCHES
Original Filed Feb. 14, 1936
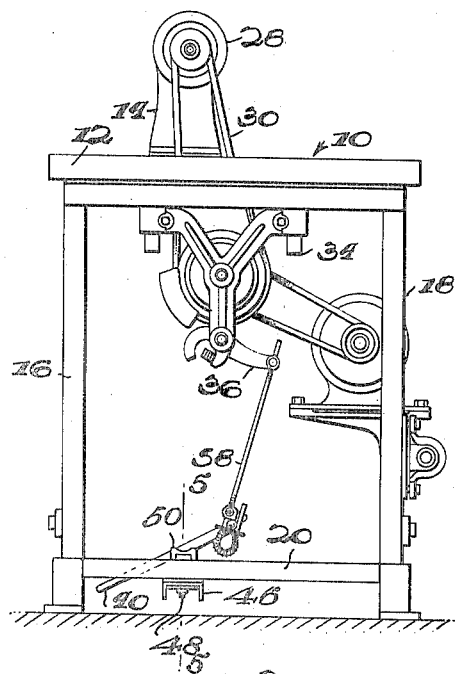
Fig. 1.
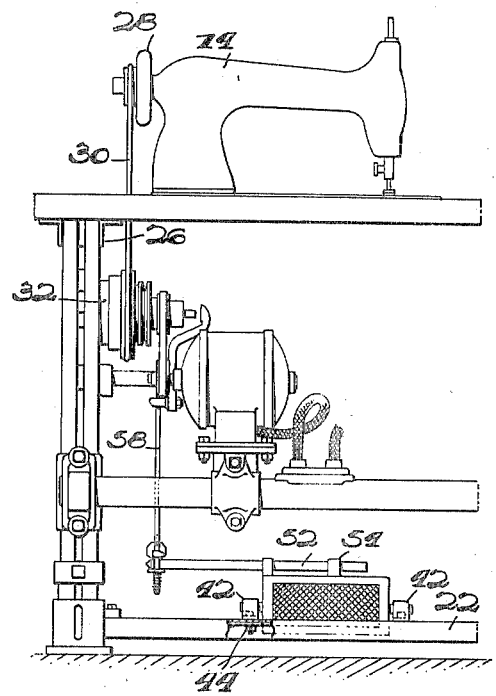
Fig. 2.
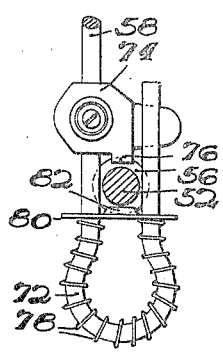
Fig. 3.
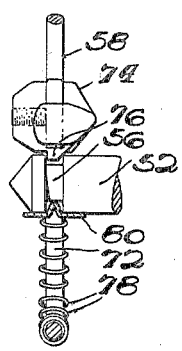
Fig. 4.
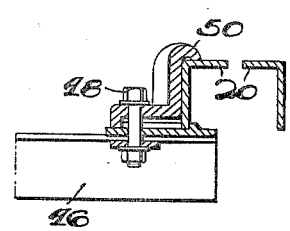
Fig. 5.
Inventor
Walter A. Adams.
By 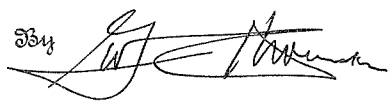
Attorney Patented Nov. 19, 1940

2,222,219

UNITED STATES PATENT OFFICE 2,222,219

TREADLE CONNECTION FOR POWER TRANSMITTER CLUTCHES

Walter A. Adams, Rochester, N. Y.

Original application February 14, 1936, Serial No. 63,977. Divided and this application March 4, 1940, Serial No. 322,242

9 Claims. (Cl. 74—582)

The improved treadle connection comprising the present invention is primarily adapted for use in connection with power tables for sewing machines and the like in establishing a connection between the usual foot treadle and the clutch mechanism by means of which the transmission for driving the sewing machine is thrown into and out of operation. The invention, however, is capable of other uses and the treadle connection may, with or without modification, be employed in establishing a connection between an operating treadle and a clutch mechanism regardless of the use to which the latter may be put.

This application is a division of my copending application Serial No. 63,977, filed February 14, 1936, for Power table for sewing machines and the like.

The principal object of the invention is to provide a treadle mechanism for operating a transmission clutch having associated therewith a cushioning means in the form of a yieldable lost-motion connection by means of which pressure applied to the treadle is effectively cushioned during at least a portion of the treadle stroke.

Another object of the invention is to provide a treadle mechanism of this character in which the cushioning means above referred to may be adjusted to compensate for the different operating characteristics of different clutch mechanisms; to compensate for varying relative positions of the treadle with respect to the clutch mechanism; to permit a predetermined pressure to be utilized in the cushioning means itself, or for any reason whatsoever.

It is another object of the invention to provide such a treadle mechanism in which the cushioning means is effected in a relatively simple manner and with a relatively few number of parts, thereby resulting in a structure which is inexpensive to manufacture, easy to assemble and one which is unlikely to get out of order.

A further object of the invention is to provide a treadle mechanism in which the force applied by the treadle itself may be offset with respect to the operating lever for the clutch mechanism, yet in which, notwithstanding this, and notwithstanding the fact that a lost-motion cushioning effect is utilized, the various parts thereof will not stick or bind during movement of the treadle in either direction from a pressure applying position to a position of release or vice versa.

Still another object of the invention is to provide a treadle mechanism for power tables in which the treadle itself may be adjusted with respect to the table to accommodate the preferences of different operators without materially varying the desired cushioning effect or otherwise altering the operation of the mechanism as a whole.

The provision of such a treadle mechanism which, despite its adjustability and sensitiveness as regards the cushioning effect employed, is rugged and durable and capable of withstanding hard usage is another feature of the invention that has been borne in mind in the production and development of the present invention.

Other objects and advantages of the invention, not at this time enumerated, will become apparent as the nature of the same is better understood.

In the accompanying drawing:

Figure 1 is an end elevational view of a power table showing the improved treadle mechanism applied thereto.

Figure 2 is a fragmentary side elevational view of the power table shown in Figure 1.

Figures 3 and 4 are fragmentary enlarged detail side and rear elevational views respectively of a cushioning lost-motion connection existing between the treadle bar and its connecting rod as employed in connection with the present invention, and Figure 5 is a sectional view taken substantially along the line 5—5 of Figure 2.

Referring now to Figures 1 and 2 of the drawing, a power table 10 is provided with a top 12, upon which there is mounted a sewing machine 14 or other operating instrumentality. The table 10 includes a pair of front legs 16 and a pair of rear legs 18 connected at their lower ends by side members 20 and front and rear members 22. The front and rear legs 16 and 18 are connected together adjacent the upper ends thereof by means of angle bars 26 which, together with these legs, constitute a rigid supporting assembly for the table top 10.

The sewing machine 14 or other operating instrumentality is provided with a driven pulley 28 which is connected by means of a driving belt 30 with an idler transmitter 32 of conventional design and which is supported for vertical adjustment on a plurality of suspension studs 34 depending from the framework of the power table 10. The transmitter 32 is provided with a clutch (not shown) adapted to be operated by means of a clutch lever 36 to apply or discontinue driving torque to the driven pulley 28 of the machine 14, such torque being supplied to the transmitter from an electric motor M by means of a belt 29.

The arrangement of parts thus far described is purely conventional in its design insofar as the present application is concerned and no claim is made herein to any novelty associated therewith, the novelty residing rather in the treadle connections for actuating the clutch lever 36 as now will be described in detail.

Still referring to Figures 1 and 2, a treadle 40 is supported for rocking movement in bearings 42 (Figure 1) which are clamped by means of clamping studs 44 to a pair of angle bars or rails 46 (see also Figure 5) which are adjustably connected at their ends to the side members 20. The position of the treadle 40 may thus be adjusted forwardly and rearwardly relative to the power table 10 to accommodate the preference of different operators. Toward this end the ends of the angle bars 46 are engaged by clamping bolts 48 that extend through clamps 50 by means of which the angle bars 20 are engaged to maintain the rails 46 in any desired adjusted position.

The treadle connections comprising the present invention include a treadle bar 52 (Figure 1) which is secured by means of spaced brackets 54 to the rear edge of the treadle 40 for longitudinal sliding movement with respect thereto. The outer end of the treadle bar 52 is formed with an annular groove 56 (Figures 3 and 4), the purpose of which will presently appear.

A connecting rod 58 is pivotally and adjustably connected adjacent its upper end to the outer end of the clutch lever 36 by means of the adjustable connection 51 shown in Figure 1.

Referring now to Figures 3 and 4, the lower end of the connecting rod 58 is bent as at 72 to provide an outwardly bowed portion and the free end of the rod 58 is maintained spaced from the main body portion of the latter by means of a clamp 74 secured for vertical adjustment on the body portion of the rod 58. A downwardly extending lug 76 formed on the clamp 74 extends into the groove 56 formed in the end of the treadle bar 52 in such a manner that the treadle bar is prevented from shifting longitudinally in its bearings 54 while the free end thereof enters the space between the two legs of the bowed portion of the connecting rod 58.

A coil spring 78 surrounds the lower end of the connecting rod 58 in the bowed regions thereof and the opposite ends of the spring bear upwardly against a plate 80 which occupies a position beneath the treadle bar 52 and which is formed with a lug 82 that enters the groove 56 formed in the former. Thus it will be seen that the effective movements of the treadle 40 in raising and lowering the connecting rod 58 to operate the clutch lever 36 will be cushioned by the spring 78, while at the same time a floating lost-motion connection is provided between the connecting rod 58 and the treadle.

By virtue of this adjustable connection between the upper end of the rod 58 and the outer end of the clutch operating lever 36, the effective length of the rod 58 may be adjusted to accommodate clutch mechanisms having different operating characteristics. Furthermore this latter adjustable connection together with the adjustability afforded by the lost-motion connection already described between the rod and treadle, permits any adjustment of the treadle forwardly or rearwardly on the power table framework to be compensated for without destroying the operating relationship existing between the treadle and clutch lever through the treadle connections. Finally, the adjustable features of the lost-motion connection per se permits the cushioning effect to be modified according to the force that is required to be overcome in operating the clutch lever 36.

The invention is not to be limited to the exact arrangement of parts shown in the accompanying drawing or described in this specification and various changes in the details of construction may be resorted to without departing from the spirit of the invention. Only insofar as the invention has particularly been pointed out in the appended claims is the same to be limited.

What is claimed is:

1. A connecting device for lever operated clutch mechanisms comprising an elongated rod adapted to be connected at one end thereof to the clutch lever and at the other end to a treadle bar, a clamp secured to the rod, a plate through which the rod extends, said plate being slidable on the rod, and spring means normally urging the plate toward the clamp to engage the treadle bar therebetween.

2. In apparatus of the character described, the combination with a treadle bar having an annular groove adjacent the end thereof, of a connecting rod in the form of an elongated bar, a clamp secured to said bar, a clamping plate having an aperture therein, said rod loosely extending through the aperture whereby the plate is slidable on the rod, spring means normally urging the plate toward the clamp to engage the end of the treadle bar therebetween, and means formed on one of the clamping members and extending into said groove to prevent lateral shifting of the treadle bar relative to the connecting rod.

3. In apparatus of the character described, the combination with a treadle bar having an annular groove adjacent the end thereof, of a connecting rod in the form of an elongated bar, one end of the rod being curved to provide a bight portion, a clamp secured to the rod and bridging the bight portion, a clamping plate slidably mounted on said bight portion, means normally urging the plate toward the clamp to engage the grooved end of the treadle bar therebetween, and means on one of said clamping members and extending into the groove for preventing lateral shifting of the treadle bar relative to the connecting rod.

4. In apparatus of the character described, the combination with a treadle bar having an annular groove adjacent the end thereof, of a connecting rod, one end of the connecting rod being curved to provide a bight portion, the free end of the treadle bar extending through said bight portion and having floating movement therein thus providing a lost-motion connection between the treadle bar and connecting rod, cushioning means normally taking up the lost motion between the bar and rod, and means connected to said bight portion on opposite sides of said bar and projecting into said groove for preventing lateral shifting of the treadle bar relative to the connecting rod.

5. In apparatus of the character described, the combination with a treadle bar having an annular groove adjacent the end thereof, of a connecting rod, one end of the rod being reversed upon itself to provide a bight portion presenting substantially parallel leg portions, the grooved end of the treadle bar projecting between said parallel leg portions, a clamp connecting said leg portions and maintaining the same in fixed spaced relationship and bearing against the treadle bar on one side thereof to limit relative movement between the latter and the rod, a plate connected to and extending across the leg portions of the rod on the other side of the bar, means carried by the bight portion of the rod normally urging the plate into engagement with the rod, and a finger on the clamp extending into said groove to prevent shifting of the treadle bar relative to the connecting rod.

6. In an apparatus of the character described, a treadle bar connection comprising a connecting rod having one end reversed upon itself to provide a bight portion presenting substantially parallel leg portions for receiving the treadle bar therebetween, means connecting said leg portions and maintaining the same in fixed spaced relationship and adapted to bear against the treadle bar on one side thereof to limit relative movement between the latter and the rod in one direction, and means mounted on the bight portion of the rod for cushioning the motion of the bar relative to the rod in the other direction.

7. In an apparatus of the character described, the combination with a treadle bar having an annular groove in one end thereof, a connecting rod therefor having one end reversed upon itself to provide a bight portion presenting substantially parallel leg portions between which said end of the treadle bar extends, a clamp connecting said leg portions and maintaining the same spaced from each other, a lug on said clamp extending into said groove, a plate slidably connected to said leg portions and bridging the same, a lug on said plate projecting into the groove, and a spring mounted on the bight portion of the rod and having its ends bearing against said plate to normally cause the treadle bar to be yieldingly engaged between the clamp and plate.

8. In apparatus of the character described, the combination with a treadle bar having an annular groove adjacent the end thereof, of a connecting rod in the form of an elongated bar, a clamp secured to said bar, a clamping plate having an aperture therein, said rod loosely extending through the aperture whereby the plate is slidable on the rod, spring means normally urging the plate toward the clamp to engage the end of the treadle bar therebetween, and means formed on the clamp and extending into said groove to prevent lateral shifting of the treadle bar relative to the connecting rod.

9. In apparatus of the character described, the combination with a treadle bar having an annular groove adjacent the end thereof, of a connecting rod in the form of an elongated bar, a clamp, means adjustably securing the clamp to the bar, a clamping plate having an aperture therein, said rod loosely extending through the aperture whereby the plate is slidable on the rod, spring means normally urging the plate toward the clamp to engage the end of the treadle bar therebetween, and means formed on one of the clamping members and extending into said groove to prevent lateral shifting of the treadle bar relative to the connecting rod.

WALTER A. ADAMS.